United States Patent [19]

Gander

[11] 4,307,380

[45] Dec. 22, 1981

[54] TRANSMITTING SIGNALS OVER ALTERNATING CURRENT POWER NETWORKS

[75] Inventor: Jean-Gabriel Gander, Zug, Switzerland

[73] Assignee: LGZ Landis & Gyr Zug AG, Zug, Switzerland

[21] Appl. No.: 863,467

[22] Filed: Dec. 22, 1977

[30] Foreign Application Priority Data

May 17, 1977 [CH] Switzerland ............... 6125/77

[51] Int. Cl.³ .............................................. H04B 3/54
[52] U.S. Cl. .............................. 340/310 R; 178/66.1; 179/15.55 T
[58] Field of Search ............ 340/310 R, 310 A; 179/15.55 T; 325/30, 163, 342, 346, 45, 145; 178/66 R, 66.1; 332/16 R; 455/42, 110, 208; 375/51, 45, 62, 92

[56] References Cited

U.S. PATENT DOCUMENTS

| | | | |
|---|---|---|---|
| 3,445,814 | 5/1969 | Spalti ............................ | 340/310 R |
| 3,975,763 | 8/1976 | Kitamura ...................... | 179/15.55 T |
| 3,997,973 | 12/1976 | Buss ............................... | 333/70 T |
| 4,005,274 | 1/1977 | Vagliani ...................... | 179/15.55 R |

FOREIGN PATENT DOCUMENTS

| | | |
|---|---|---|
| 2239113 | 2/1974 | Fed. Rep. of Germany . |
| 2445388 | 4/1975 | Fed. Rep. of Germany . |
| 2415589 | 7/1965 | Switzerland . |
| 504139 | 4/1971 | Switzerland . |

*Primary Examiner*—James J. Groody
*Attorney, Agent, or Firm*—Morgan, Finnegan, Pine, Foley & Lee

[57] ABSTRACT

This invention relates to communication systems of the type particularly useful in power line communications. Signals to be transmitted, which can be in the form of short, fixed frequency signals, are expanded in time and/or bandwidth to provide a longer signal with a variable frequency. At the receiver, power line noise, which is typically either short wideband noise or long narrowband noise, is removed and the remaining expanded signal is detected. The expanded signal can then be compressed in time and/or bandwidth to reproduce the original signal.

20 Claims, 12 Drawing Figures

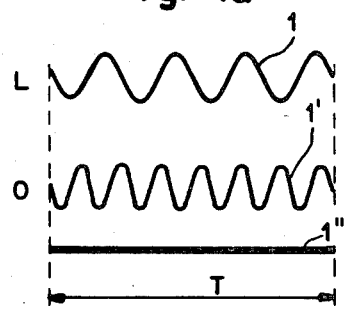
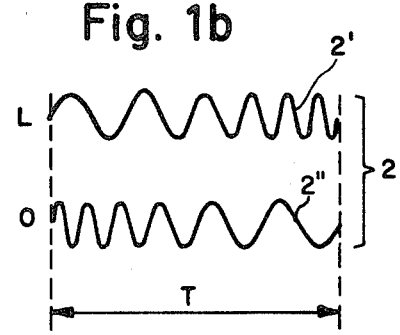
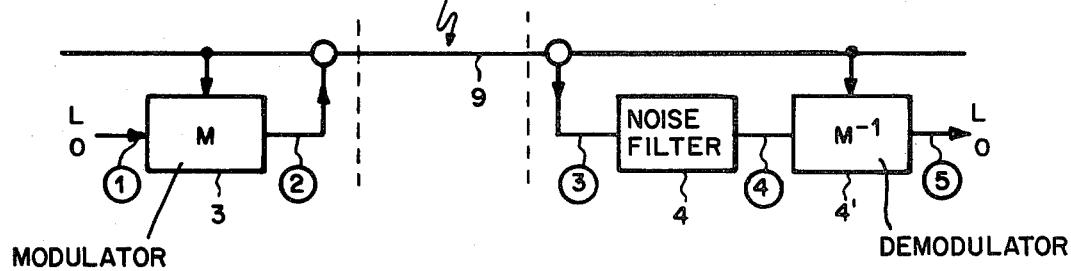
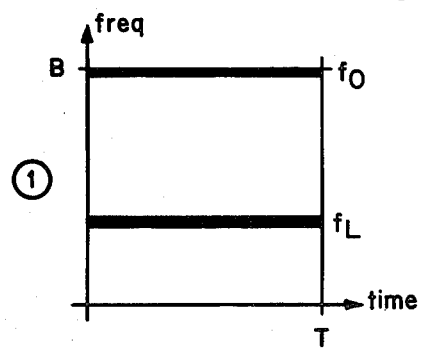
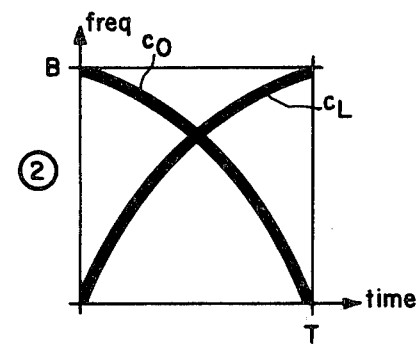
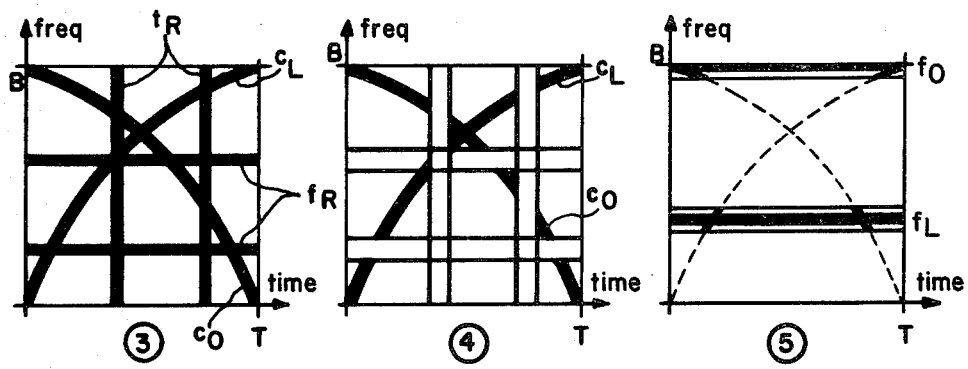

TRANSMITTING SIGNALS OVER ALTERNATING CURRENT POWER NETWORKS

BACKGROUND OF THE INVENTION

1. Field of the Invention

This invention relates to methods of and apparatus for transmitting signals over the lines of an alternating current power distribution network using audio-frequency signals.

2. Description of the Prior Art

The best known method of transmitting signals over the lines of an alternating current power supply network is the audio-frequency power line carrier control method, otherwise known as the ripple control method. In this method, audio-frequency signals of small bandwidth are transmitted from one or a few centrally located transmitters over the power supply network, and are evaluated in a plurality of receivers distributed about the network, for carrying out instructions of different types. In this method, the transmission speed and consequently the amount of information transmitted per unit of time is relatively small.

Methods are also known which, in many respects, are similar to that described immediately above, and in which for example the counter state of counters distributed about the network, or information concerning the carrying out of instructions in the audio-frequency power line carrier control method are reported back to a central station. Throughout this specification instructions and information will be referred to collectively as "intelligence". Reporting takes place in the opposite direction to the flow of power, and for reporting back it is necessary to have a plurality of transmitters with a relatively small capability, and which must be inexpensive, whilst there is only one or a few centrally located receivers, which may therefore be relatively expensive. Thus, it has been proposed to report the consumption of fixed quantities of energy with the aid of devices actuated by audio-frequency power line carrier control signals, which cause the instantaneous coupling of a resonant circuit between two power lines in the individual counters, followed by the evaluation of the signals so transmitted to a control receiver having extremely selective electronic filters (Austrian Pat. No. 241,589). A later method has been described in which for reporting in the reverse direction to the flow of power in the network, extremely narrow band signals from a band between two power supply frequency harmonics, for example between 120 and 180 Hz is used in a frequency division multiplex method for transmitting information from a plurality of stations distributed about the network to a central station. Reporting back can be initiated by the normal audio-frequency power line carrier control system. The difficulty of reporting back over different network levels, involving passage of the signals through the intermediate transformers, is allegedly eliminated in a further proposal for reporting back counter states via the network by using relatively high audio-frequencies between 1 and 20 kHz and transmitters with a low resistance output and with a power level of at least 1 watt (German Offenlegungsschrift No. 2,445,388). Finally, Swiss Pat. No. 504,139 proposes for the purpose of increasing the quantity of information to be transmitted and the transmission speed, to limit the length of the pulses to be transmitted to a maximum of one eighth of a cycle of the power supply voltage, whilst the signals can have a spectrum of several hundred hertz corresponding to the transmission range of the network.

SUMMARY OF THE INVENTION

One object of the present invention is to provide an improved method of transmitting signals over the lines of an alternating current power distribution network using audio-frequency signals.

Another object of the present invention is to provide a method of transmitting signals over the lines of an alternating current power distribution network with greater reliability and immunity from noise than hitherto.

Another object of the present invention is to provide a method of transmitting signals over the lines of an alternating current power distribution network using low power transmitters and obtaining an improved signal/noise ratio.

Another object of the present invention is to provide a method of transmitting signals over the lines of an alternating current power distribution network using novel signal modulation methods.

According to the present invention there is provided a method of transmitting signals over the lines of an alternating current power distribution network from a transmitter to a receiver, said network having a predetermined signal frequency transmission range, comprising the steps of producing at said transmitter an audio-frequency signal representing intelligence to be transmitted and having a given frequency band-width and time duration, expanding said signal at said transmitter to produce a relatively long time duration, relatively wide-band signal having at least some frequency components within said transmission range, transmitting said expanded signal over said network to said receiver, compressing the received said expanded signal at said receiver in at least one of time and frequency, and evaluating said compressed signal to derive said intelligence.

The invention also provides apparatus for performing said method.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 1a and 1b show waveforms;

FIG. 2a shows a block diagram of an illustrative circuit and FIG. 2b shows frequency/time diagrams associated therewith;

FIGS. 4A–D show pulse and filter characteristics;

DESCRIPTION OF THE PREFERRED EMBODIMENTS

Figure 3:
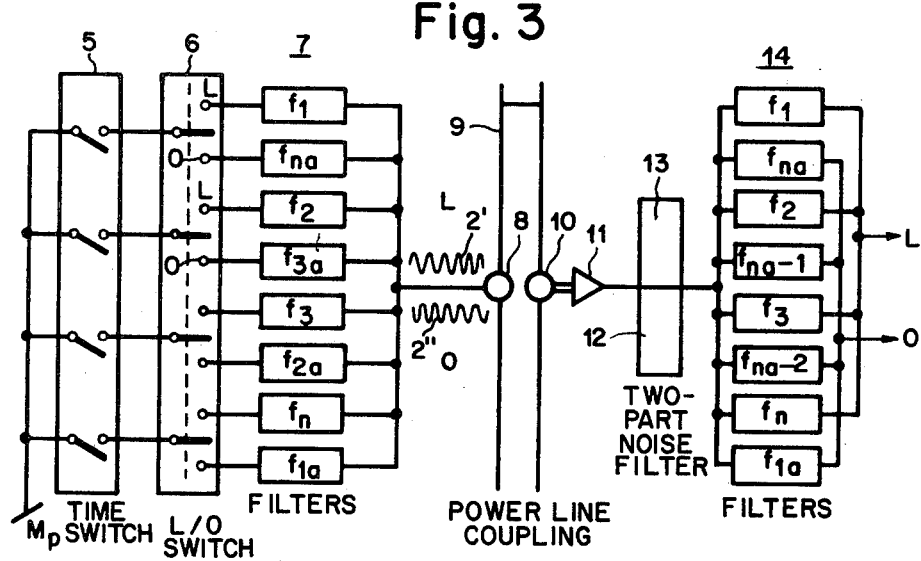
FIG. 3 shows a passive system with transmitters and receivers.

FIGS. 1a and 1b show pulsed audio-frequency signals. FIG. 1a shows a narrow band signal, and FIG. 1b a wide band signal the frequency of which varies within the time duration of the pulse.

In FIG. 1a an audio-frequency signal 1 of frequency $f_L$ produced in a transmitter forms an "L" instruction, while the "O" instruction can either be represented by the absence of the audio-frequency signal 1, as indicated by the line 1", this being in effect on-off keying (OOK), or by an audio-frequency signal 1' of, in the present case, higher frequency $f_O$, this being in effect frequency shift keying (FSK). In FIG. 1b the audio-frequency signal 2' increases in frequency during the time duration of the pulse and can be used as an "L" instruction, and the audio-frequency signal 2" decreases in frequency during the time duration of the pulse (each of these signals is sometimes known as a chirp signal), and can be used as a "O" instruction.

The basic concept of the system to be described is based on conversion of the information to be transmitted into a signal which differs as much as possible from the characteristics of any noise present on the power-supply network. This makes it possible to provide a system which is insensitive to noise such as noise spikes, while at the same time causing very little attenuation of the wanted signals. This permits reliable transmission with a low signal strength.

As is known, network noise comprises two main components, these being narrow band harmonics of the network frequency and short pulses. A signal will be relatively insensitive to both these types of interference if it has appreciable duration and is not limited to a single frequency. The audio-frequency signal 2" is shown in FIG. 1b is an example of such a signal, being swept in frequency and having a time duration T. The sweeping can take place according to a function M. A signal of this type which is swept in accordance with a linear function M is used in radar technology, see for example FIG. 9a of U.S. Pat. No. 3,997,973. In the illustration FIGS. 1a and 1b, as is apparent from the drawings, function M is a linear function and, thus, provides a constant change of frequency with time.

In the case of audio frequency power line ripple control systems, if there is no narrow band or short duration interference present, the amplitude of the residual noise at the output of the demodulator of a receiver of such a signal can be attenuated by a factor between about 10 and 100. This noise attentuation effect gives excellent insensitivity to noise spikes, and this is a particular advantage in the presence of network faults.

An embodiment of a wide-band transmission system according to the invention is shown in FIG. 2a. The encircled reference numerals indicate the locations at which the signal waveforms designated in FIG. 2b by the same encircled numbers occur.

FIG. 2a shows a transmitter comprising a modulator 3, which is preferably synchronised with the network frequency, and a receiver comprising a noise filter 4 and a demodulator 4' which is preferably also synchronized with the network frequency. The information can, as indicated in the frequency/time diagram ① of FIG. 2b bounded by the band-width B and the time duration T, be audio frequency signals such as 1 and 1' illustrated in FIG. 1a having a particular audio-frequency $f_L$ or $f_O$. The information can be at time-defined pulse locations or at particular audio-frequency locations, as desired. Modulator 3 fed with instruction "L" or "O" forms a signal ② for example a signal expanded in the time and frequency scale according to a sine function N. Expansion can also take place according to some other function M, and may involve expansion in time and/or frequency. In the case of time expansion, the signal carrying the original instruction "L" or "O" is spread over the time duration T, and in the case of spreading on the basis of frequency, is spread over the entire band-width B. For the instruction "L", spreading takes place according to function $c_L$, and for instruction "O" spreading similarly takes place according to function $c_O$. Any two functions which are different can be used to differentiate the two states.

The expanded signal is transmitted via power line 9 and is partly masked by network noise, see ③. As has already been stated, network noise is mainly narrow-band spurious signals $f_R$, for example caused by harmonics of the power supply frequency and short transients in the network, for example due to lightning or similarly caused interference pulses $t_R$. If the receiver contains no noise filter 4, the demodulation of noise-carrying signal ③, attenuated by the transmission path, with the product of band-width and time duration (BT) in modulator 4' having the reciprocal function $M^{-1}$, accompanied by compression, results in a signal which is at least analogous to the original signal with reference to frequency $f_L$ or $f_O$ or the time-defined pulse location $t_L$ or $t_O$, as indicated by signal ⑤. Each noise component is attenuated by reduction factor D, because only the part of the noise the shaded areas $c_L$ and $c_O$ appearing in the detection windows (illustrated in ④) indicated by shading lines appears at the output of the demodulator 4'. This reduction of the noise is independent of the location of the original noise component in the form of time pulses $t_R$ or narrow band frequency contents $f_R$. This characteristic shows the advantage of the present signal transmission system compared with the hitherto known narrow-band system which is extremely sensitive to narrow-band interference and noise spikes.

Obviously, no reduction of the noise can be obtained if the spurious frequencies of time-defined noise factors are distributed over the entire range defined by the band-width B and the time duration T. However, as in practice the noise components never occupy the entire range, the noise is reduced relative to the wanted signal.

The present signal transmission system offers the additional advantage that by providing the noise filter 4, which can for example comprise a comb filter and a limiter, narrow strips of the signal ④ can be removed corresponding to expected noise. As these strips may have a limited extension compared with the complete range BT they will only bring about a limited attenuation of the wanted signal $c_L$ or $c_O$, which is necessarily also suppressed in these strips. As a result, a very high signal/noise ratio can be obtained.

A preferred and subsequently described embodiment of the invention uses special modulation functions M in which the wanted signal has no components in the spurious frequency ranges $f_R$, corresponding for example to harmonics of the network frequency. This relationship, referred to as orthogonality, between the wanted signal and spurious frequencies leads to an optimum signal/noise ratio, even when there is no comb filter in the noise filter 4.

For the modulation function M and the demodulation $M^{-1}$, which is the reciprocal of the former, to be particularly effective, they must be matched to one another or interconnected by a common relationship. This relationship can be produced by the sinusoidal waveform of the network voltage.

A practical embodiment of the invention is shown in FIGS. 3 and 5 to 7.

FIG. 3 shows a passive system with transmitters and receivers, in which the transmitted signal is produced by a plurality of successive audio-frequency pulses. The transmitter comprises a time switch 5 which acts as a signal generator, a multiposition switch 6, a group of filters 7 and a coupling 8 to the power line 9. The mains-side connections of the individual filters in filter group 7 are interconnected. The connections remote from the power line 9 are connected to the individual contacts of the multiposition switch 6, whose contact arms are connected to the individual contacts of the time switch 5. The contact arms of the time switch 5 are together applied to ground line $M_p$.

The receiver is constructed in a very simple manner, comprising a coupling 10 to the power line 9, an amplifier 11, a two-part noise filter 12, 13 and a group of filters 14 corresponding to the filter group 7 of the transmitter, with in each case one output for the "L" signal and for the "O" signal. For example, these outputs can be connected with two windings of a bistable indicating relay. All the mains-side connections of the individual filters of the filter group 14 are interconnected, whilst the opposite connections are alternately connected with the line carrying the "L" signal or the "O" signal.

A similar construction of the receiver can be provided having in each case two filters matched to the different frequencies, and deriving components with opposite time lags at high and low frequencies, whereby one filter feeds the output for the "L" signal and the other the output for the "O" signal.

The operation of the system of FIG. 3 can be explained with the aid of the pulse and filter characteristics of FIG. 4, which are shown directly below the corresponding circuit parts. As an example, there are two different modulation functions M, namely a linear and a sinusoidal stepped function for both characteristics, instead of the previously defined signal representations determined by special frequencies $f_L$ or $f_O$ or time intervals $t_L$ or $t_O$, and requiring in each case only one transmission function.

Figure 4A:
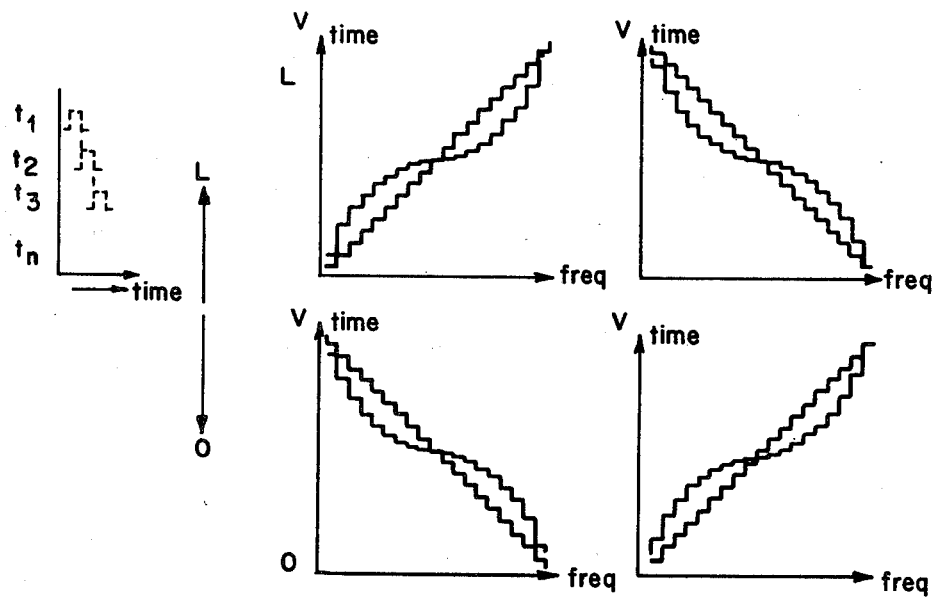

The time switch 5 which can, for example, comprise a shift register, produces successive connections between the combined inputs applied to the earth line $M_p$ and the contacts of the individual outputs, as shown in FIG. 4a. Thus, the transmitted signal comprises several short pulses. The outputs are connected to the associated switching arms of the multiple-way switch 6, which is for example in the upper position in the case of an "L" instruction and in the lower position in the case of a "O" instruction. FIG. 4b shows the corresponding position of the switching arm.

The filter group 7 comprises individual filters $f_1$, $f_{1a}$, $f_2$, $f_{2a}$, $f_3$, $f_{3a}$ to $f_n$, $f_{na}$ matched in pairs to the same frequency. The individual frequencies are selected in such a way that the signal never interferes with the harmonics of the network voltage. Thus, as described hereinbefore, the desired signal and the noise are orthogonal to one another. For example, the individual filters have the following resonance frequencies: $f_1$ and $f_{1a}$, 1030 Hz; $f_2$ and $f_{2a}$, 1130 Hz; $f_3$ and $f_{3a}$, 1230 Hz; $f_n$ and $f_{na}$, 3030 Hz. The individual filters can comprise individual series resonance circuits, as is known for a single resonant circuit. The switching sequence associated with an "L" signal is regulated for filters $f_1$, $f_2$, $f_3$ to $f_n$ in such a way that the time lag V of the low frequencies is smaller than the time lag V of the higher frequencies. In the case of the filters $f_{1a}$, $f_{2a}$, $f_{3a}$ to $f_{na}$ associated with a "O" signal, the time lag V is smaller for the high frequencies than for the low frequencies. These time lags are shown diagrammatically in FIG. 4c. As a result, when an "L" instruction is set, time switch 5 and the corresponding individual filters $f_1$, $f_2$, $f_3$ to $f_n$ arranged in succession between power line 11 and earth line $M_p$ produces a time and frequency-expanded pulse signal 2' for the "L" instructions, as shown in FIG. 3 above the connection with coupling 8. However, in the case of "O" instructions, the individual filters $f_{1a}$, $f_{2a}$, $f_{3a}$ to $f_{na}$ are decisive and produce a pulse train 2" below the connection of filter set 7 with coupling 8.

The switching speed of the individual switches 5 depends on the desired frequency increase or decrease of the transmitted signals, the transmission speed provided for the "L" and "O" instructions, and consequently their signal time durations T as well as the number of individual filters in filter group 7 to be switched. However, the switching time of each switch 5 is in all cases a fraction of the total signal time. Thus, it is possible to produce transmitted signals with linear or sinusoidal stepped shapes (FIG. 4c), or in accordance with a frequency increasing or decreasing according to some other random function M during the time duration T of one signal. The switching function for the "L" signal in this case takes place reciprocally to that for the "O" signal, so that the expanded signals 2 of FIG. 2a associated with the "L" instructions or "O" instructions have increasing or decreasing frequencies during the signal time duration T.

The signal time duration T can be selected in such a way that it permits a transmission speed of 20 to 100 bits per second. The switching speed in time switch 5 is then naturally maintained in accordance with the number of individual filters to be switched.

As the filters of filter group 7 are only very briefly connected with the power line during each instruction, they can be made correspondingly small and inexpensive.

Time switch 5 can be controlled by a very limited output. It can also be controlled in such a way that by the connection of filters of filter group 7 which are excluded in the frequency range, command signals are produced by frequency division multiplex. These cover only a part and not the whole frequency range of 1030 to 5030 Hz, for example 1030 to 2030 Hz, 2030 to 3030 Hz, 3030 to 4030 Hz and 4030 to 5030 Hz. Preferably, the connections in time switch 5 are derived from the network frequency. As a result, transmitted signals modulated in sinusoidal and stepped manner can easily be produced (FIG. 4c). Furthermore, time switch 5 can also operate continuously and then only multiposition switch 6 with the individual filters or filter group 7 is controlled with "L" instructions or "O" instructions in a time division multiplex method as a function of an instruction program. In this connection, an uninterrupted frequency spectrum of 3030 to 5030 Hz can for example be used for each transmitted signal. During the transmission pauses, the switching arms of multiposition switch 6 can be in a rest position, as shown in FIG. 3, in which there is no connection with the individual filters.

The various time lags relative to the pulse trains provided for the "L" instructions and the "O" instructions can preferably be produced by switch 5 switching the individual filters $f_1$, $f_2$, $f_3$ to $f_n$ in reverse order. In this case, filters $f_{na}$, $f_{3a}$, $f_{2a}$ to $f_{1a}$ and multiple-way switch 6 are superfluous. There are also fewer problems concerning the time lags of the individual filters. Furthermore, the quality of the filters may be such that although the pulse trains of the individual filters of filter group 7 are filtered, the time constant must not be too long.

The instruction signals, the frequency of which increases or decreases over the signal time duration shown in FIG. 1b, and modulated according to FIG. 4c are then transmitted by means of a coupling 8 via the power lines 9 to at least one receiver. For reasons of simplicity, the coupling 8 can comprise a single capacitor.

At the receiver, the pulse trains separated from the power lines 9 by a coupling 10 are amplified by an amplifier 11, freed from network noise by noise filters 12, 13 and compressed by a filter group 14. The individual filters $f_1$, $f_{na}$, $f_2$, $f_{na-1}$, $f_3$, $f_{na-2}$, to $f_n$ and $f_{1a}$, which with regard to frequency correspond to those at the transmitter, have characteristics such that the filter group 14 for compressing the pulse train acts similarly to the corresponding filters of the filter group 7 of the transmitter associated with the individual instructions, that is for the "L" signals filters $f_1$, $f_2$, $f_3$ to $f_n$ are dimensioned in such a way that the higher frequency signals are delayed less than the lower frequency signals (FIGS. 4c and 4d). As a result of this modified demodulation on the "L" line for the "L" instructions, representative time and frequency-compressed signals are produced, and on the "O" line for the "O" instructions, frequency and time-compressed signals are produced, and are supplied to a corresponding evaluation circuit, a bistable relay or a bistable multivibrator. The harmonics of the mains frequency and other spurious pulses contained in the input signal following compression only have a limited power level, whereas the compressed wanted signals have a high power level, as has been explained hereinbefore. The magnitude of the signal/noise ratio can be further improved by the noise filters 12, 13 as has already been explained. Further details will be given when discussing FIG. 7. The amplifier 11 can also be positioned downstream of filter group 14, but in that case each of the lines "L" and "O" requires its own amplifier. Depending on the requirements, the signal can also be amplified before and after the filter group 14. Finally, the individual filters of filter groups 7 and 14 can be connected in series.

Figure 5:
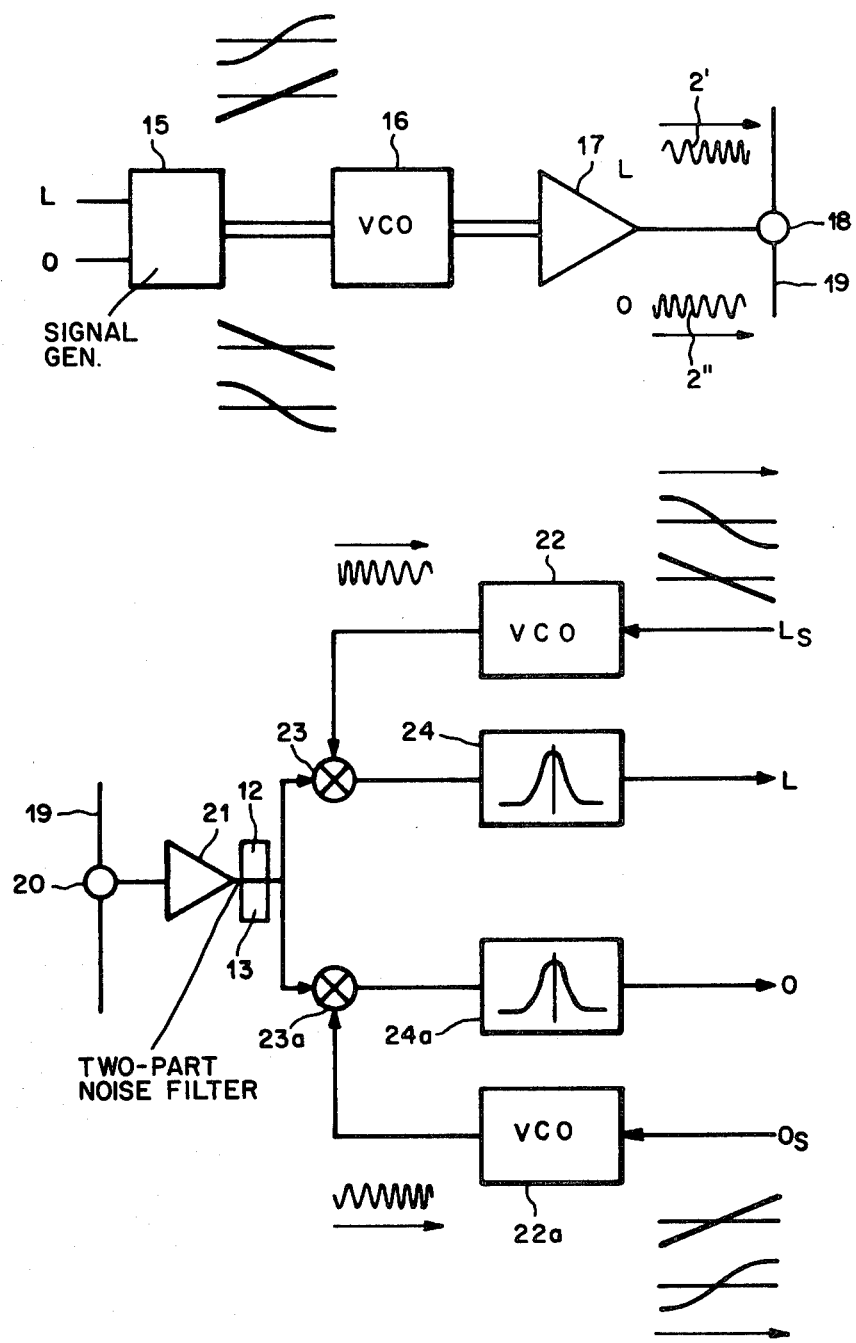
FIG. 5 shows an active system with transmitters and receivers.

FIG. 5 shows an active system with a transmitter containing a signal generator 15, a modulatable voltage or preferably current-controlled oscillator 16, an amplifier 17 and a coupling 18 to the power line 19. The receiver is provided with a coupling 20 to the power line 19, an amplifier 21, a noise filter 12, 13 and two evaluation devices. Each evaluation device comprises a modulatable voltage or current-controlled oscillator 22 or 22a controlled by a signal produced by a signal generator (not shown), a mixer 23 or 23a subject to the action of its output signal and the input signals received, and a modified narrow-band filter 24 or 24a connected to the output of mixer 23 or 23a and supplying respectively the "L" or "O" signal.

The transmitter of FIG. 5 functions as follows. The signal generator 15 modulated by the "L" instruction or the "O" instruction and scanned by a driving signal produces for the "L" instruction by means of the oscillator 16a (for example linear) or preferably sinusoidally rising signal, or for the "O" instruction an identical, but reverse direction signal. The signal can also be in stepped form in order to produce orthogonality between the above-described wanted signal and the network frequency harmonics, wherein control frequencies in the range of the spurious frequencies $f_R$ are avoided. As a result of this signal an expanded signal amplified by the amplifier 17 is produced in the oscillator 16, and specifically for the "L" instruction for example a signal 2' with an increasing frequency during the pulse time duration and for the "O" instruction a signal 2" with decreasing frequency during the pulse time duration. These signals are indicated above and below the line connecting the amplifier 17 to the coupling 18. The expanded signals are fed by means of the coupling 18, which can comprise a corresponding wide-band filter, a transformer or for reasons of simplicity a capacitor, into the power line 19.

The signal generator 15 is preferably controlled by a signal derived from the network frequency and is possibly also synchronized. This is particularly advantageous if a sinusoidal and stepped modulation signal is to be produced in order to improve the orthogonality between the desired signal and the noise. The same effect as with stepped control signals is obtained when said signals extend over several sine periods. However, it is also possible to use differently shaped signals, for example with a hyperbolic function. When using standard integrated components the transmitter has an extremely simple construction, which permits economically advantageous manufacture.

In the receiver, the expanded signal 2 derived by the coupling 20 is amplified by the amplifier 21 in order to obtain an adequate level for the following noise filter 12, 13 and is in each case fed to an evaluation device, one being provided for the "L" instructions and the other for the "O" instructions, as indicated hereinbefore. A signal generator (not shown) corresponding to the signal generator 15 in the transmitter produces in each case a control signal $L_s$ or $O_s$ similar to the corresponding "L" instruction and "O" instruction at the transmitter. These control signals are preferably slightly frequency-displaced relative to the desired frequency in order to facilitate processing of the demodulated signal (for example in a single band-pass filter). The control signals are fed to an oscillator 22 or 22a. The oscillator 22 produces an expanded signal which for example has a decreasing frequency during the pulse period, whilst the oscillator 22a produces a signal having an increasing frequency during the pulse period. FIG. 5 shows the signals, together with their reading direction designated by an arrow. They are now fed to an associated and preferably multiplicative mixer 23 or 23a supplied with the received and amplified input signal. By means of the mixers 23 and 23a the corresponding "L" or "O" signal is frequency-compressed, as shown under ⑤ in FIG. 2b. It is then fed to a matched filter 24 or 24a or to a frequency detector at whose output can be derived the particular instruction.

The matched filter 24, 24a can for example be a correlation system with an integrator. It is also possible to use other matched filters, such as those with a synchronous filter (phase locked loop) which lock in the narrow frequency band used. The signal generators in the receiver can also be controlled by a signal derived from the network frequency, whereby a simple synchronisation is permitted, particularly in the case of sinusoidal modulation.

If the transmitted signal requires a more complicated demodulation the complete demodulation function can be produced by an algorithm in a correspondingly programmed process computer or in a suitable integrated semiconductor circuit.

In this active system the cost of the receiver is significantly higher than of the transmitter. It is therefore particularly suitable for transmission of intelligence in an alternating current power supply system in the opposite direction to the energy flow, for example for the reporting back of instructions, the reporting of counter states or similar purposes. For such purposes, the pulses can be very short and consequently the transmission speeds can be very high. In addition, a frequency division multiplexing as in the system of FIG. 3, or a time division multiplexing and random coding are easily possible. Due to the signal compression and the elimination of network noise in the receiver, the latter are much more sensitive than the known receivers for similar purposes and are consequently more immune to interference. Energy expenditure at the transmitter can also be kept small. The receivers are also suitable for an active and adaptive equalization of the signals received by corresponding control of the signal generators.

Figure 6:
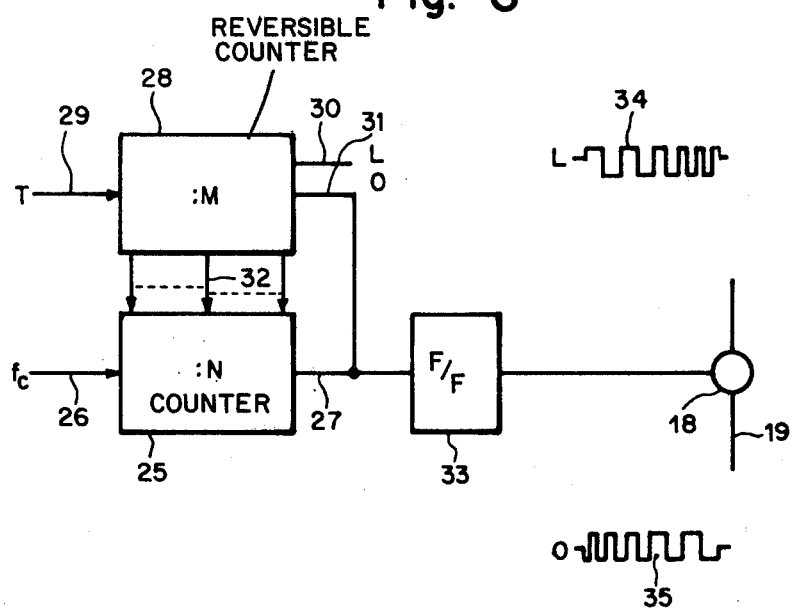
FIG. 6 shows a transmitter for a digital system.

Numerous other devices can be used for performing the method of the invention. A transmitting device for a digital system is shown in FIG. 6, and comprises a first counter 25 having a clock input 26, an output 27 and a parallel input 32 with a maximum division ratio N and a further reversible counter 28 having a maximum division ratio M. The latter comprises an instruction input 29 for signal time duration T, a program input 30, a clock input 31 and a parallel output which is connected to the parallel input 32 of the first counter 25. To the output 27 of the first counter 25 is also connected a flip-flop 33, the output of which leads to the coupling 18 on power line 19.

The transmitter of FIG. 6 functions in the following manner. The division ratio N of the first counter 25 is larger than the division ratio M of the reversible counter 28, for example N=20 and M=10. The first counter 25 is continuously switched at its clock input 26 by clock pulses preferably derived from the mains frequency with the frequency $f_c$, for example 1000 Hz. If at the instruction input 29 there is a switch-on command T which is decisive for a command signal and clock pulses determined by the division ratio N appear at its clock input 31 connected with the output 27 of the first counter 25, the reversible counter 28 counts forwards or backwards with a division ratio M in accordance with the "L" or "O" signal at its program input 30. The parallel information at its output is then transferred to the input 32 of the first counter 25 in which it is advanced in synchronism with the pulses at its clock input. The division ratios N and M are responsible for time contents $T_1$, $T_2$, $T_3$ to $T_n$ of the signal, which form part of time T, at output 27 which is then passed via coupling 18 to power line 19, optionally again divided by two in the flip-flop 33. The above times are in the following relationship to the division ratios N and M of the first counter 15 and the reversible counter 28, whereby the command signal T at input 29 of reversible counter 28 determines the entire length of output signal 34 or 35: for program "L":

$$T_1 = N/f_c;\ T_2 = N - 1/f_c;\ T_3 = N - 2/f_c;\ T_n = N - n/f_c;$$

for program "O":

$$T_1 = N - M/f_c;\ T_2 = (N-M) + 1/f_c;\ T_3 = (N-M) + 2/f_c;\ T_n = (N-M) + n/f_c$$

When the above values are selected, the timetable is as follows:

| $T_{(ms)}$ | $T_1$ | $T_2$ | $T_3$ | ...... | $T_4$ | $T_5$ | $T_6$ | ...... |
|---|---|---|---|---|---|---|---|---|
| L | 20 | 19 | 18 | | 17 | 16 | 15 | ...... |
| O | 10 | 11 | 12 | | 13 | 14 | 15 | ...... |

The two counters 25 and 28 can also be replaced by fixed-program stores or read only memories (ROM), enabling different preset division ratios to be used. In this case random, for example sinusoidally rising or falling frequency ratios according to FIG. 4c can be simulated, and can then be detected with correspondingly controlled receivers.

In general, the receiver according to FIG. 5 can also be used for the digital system. The control of oscillators 22, 22a is then dependent on the shape of the transmitted signals and this is considerably facilitated by deriving these control signals from the network frequency. Obviously, these control signals in the receiver must be matched to the signals produced in the transmitter (matched demodulations).

The systems described can preferably be combined with audio-frequency power line carrier control systems in which in addition to the normal instructions of the latter, replies can be initiated in an alternating current power supply system by audio-frequency power line carrier control transmitters, said transmitters preferably being positioned at a receiver. Several reply switches, information points, etc., can be associated with a transmitter and the information can for example be transmitted simultaneously by frequency division multiplex or any other multiplexing method. It is also possible for the audio-frequency power line carrier control transmitter to call up groups of reply transmitters which are identified by an address for the receiver in the station. It is possible to use the most varied transmission methods in frequency or time division multiplexing or corresponding codes for the identification of the individual transmitters, as defined hereinbefore.

The methods and devices according to the invention thus permit a high transmission density linked with a high transmission reliability, a small energy consumption of the individual energy transmitters and hitherto unattainable sensitivity of the receivers.

Figure 7:
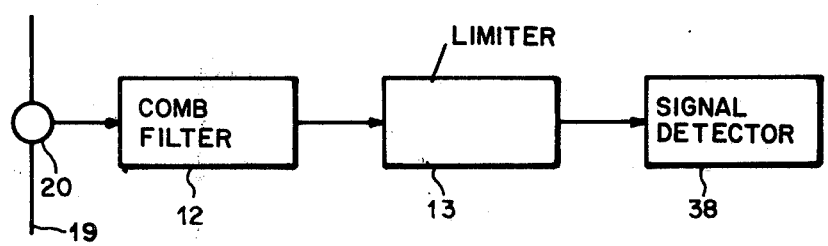
FIG. 7 shows a receiver with a high signal/noise ratio.

The sensitivity is particularly determined by a noise filter according to FIG. 7 which comprises a comb filter 12 and a limiter 13 supplying a frequency and/or noise compression producing signal detector 38. By means of comb filter 12, which can be either passive or active, it is possible almost entirely to eliminate any network harmonics or other fixed spurious frequencies, extraneous audio-frequency signals or other discrete interference in the frequency still present in the signal spectrum received. Time-discrete, steep spurious pulses passing the comb filter 12 and remaining in the signal spectrum can be limited by limiter 13, which can also be passive or active. Signal detector 38 can be connected to the limiter 13, for example as in FIG. 5, and once again controls the evaluation circuit for indicating instructions or reporting back. A signal detector 38 can be constructed and operate in the manner described hereinbefore.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of transmitting signals over the lines of an alternating current power distribution network from a transmitter to a receiver, said network having a predetermined signal frequency transmission range, comprising the steps of producing at said transmitter an audio-frequency signal representing intelligence to be transmitted and having a given frequency band-width and time duration, expanding said signal at said transmitter to produce a relatively long time duration, relatively wide-band signal having at least some frequency components within said transmission range, transmitting said expanded signal over said network to said receiver, compressing the received expanded signal at said receiver in at least one of time and frequency, and evaluating said compressed signal to derive said intelligence.

2. A method according to claim 1 of transmitting signals over the lines of an alternating current power distribution network from a power source, wherein said expanded signal is transmitted over said network in a direction toward the alternating current power source.

3. A method according to claim 1 of transmitting signals over the lines of an alternating current power distribution network, wherein said expanded signal varies in frequency according to a function which depends on the intelligence to be transmitted.

4. A method according to claim 1 of transmitting signals over the lines of an alternating current power distribution network, wherein said expanded signal is developed by selectively passing a signal through a group of passive filters which are connected to said network.

5. A method according to claim 1 of transmitting signals over the lines of an alternating current power distribution network, wherein said expanded signal is developed by a signal generator the output of which is modulated by a control signal.

6. A method according to claim 1 of transmitting signals over the lines of an alternating current power distribution network, wherein said expanded signal is modulated to have a stepped configuration.

7. A method according to claim 1 of transmitting signals over the lines of an alternating current power distribution network, wherein said expanded signal includes only frequency components which are not coincident with harmonics of the frequency of said alternating current power.

8. Apparatus for transmitting signals over the lines of an alternating current power distribution network, said network having a predetermined signal frequency transmission range, the apparatus including a transmitter comprising means for generating an audio-frequency signal representing intelligence to be transmitted and having a given frequency band-width and time duration, means to expand said signal to produce a relatively long time duration, relatively wide-band signal having at least some frequency components within said transmission range, and means to couple said expanded signal to said network, and a receiver comprising coupling means to derive said expanded signal from said network, means to compress the received said expanded signal in at least one of time and frequency, and means to evaluate said compressed signal to derive said intelligence.

9. Apparatus according to claim 8 for transmitting signals over the lines of an alternating current power distribution network, wherein said means for generating an audio-frequency signal comprises a signal generator controlled by at least one control signal, wherein at least frequency represents said intelligence.

10. Apparatus according to claim 9 for transmitting signals over the lines of an alternating current power distribution network, wherein said means for generating an audio-frequency signal comprises a first counter, a clock pulse generator to drive said counter, a second, reversible counter driven in parallel with said first counter, and means to supply a control signal to said second counter, which control signal represents said intelligence.

11. Apparatus according to claim 9 for transmitting signals over the lines of an alternating current power distribution network, wherein said means to expand said signal comprises a first group of passive filters and said means to compress the received said expanded signal comprises a second group of passive filters similar to said first group.

12. Apparatus according to claim 9 for transmitting signals over the lines of an alternating current power distribution network, wherein said means to compress the received said expanded signal comprises first and second mixers each having first and second inputs, said first inputs being coupled to receive the received said expanded signal, first and second controllable-frequency oscillators for supplying respective outputs to said second inputs of the respective said first and second mixers, means for supplying respective control signals to said first and second oscillators, and first and second filters for receiving outputs from said first and second mixers respectively, said filters also supplying output signals representing said intelligence.

13. Apparatus according to claim 12 for transmitting signals over the lines of an alternating current power distribution network, wherein said means to expand said signal comprises a third controllable-frequency oscillator responsive to said audio-frequency signal representing intelligence to be transmitted.

14. Apparatus according to claim 13 for transmitting signals over the lines of an alternating current power distribution network, wherein the levels of said control signal rises or falls linearly.

15. Apparatus according to claim 13 for transmitting signals over the lines of an alternating current power distribution network, wherein the levels of said control signal rises or falls sinusoidally.

16. Apparatus according to claim 13 for transmitting signals over the lines of an alternating current power distribution network, wherein said control signals are synchronised to the frequency of said alternating current power.

17. Apparatus according to claim 8 for transmitting signals over the lines of an alternating current power distribution network, comprising a plurality of said transmitters operative in frequency division multiplex.

18. Apparatus according to claim 8 for transmitting signals over the lines of an alternating current power distribution network, comprising a plurality of said transmitters operative in time division multiplex.

19. Apparatus according to claim 8 for transmitting signals over the lines of an alternating current power distribution network, wherein said receiver comprises a filter to filter harmonics of the frequency of said alternating current power from the received said expanded signal.

20. Apparatus according to claim 19 for transmitting signals over the lines of an alternating current power distribution network, wherein said filter is a comb filter.

* * * * *